(12) United States Patent
Tanaka et al.

(10) Patent No.: US 11,288,717 B2
(45) Date of Patent: Mar. 29, 2022

(54) VEHICLE UTILIZATION SUPPORT SYSTEM

(71) Applicant: HONDA MOTOR CO., LTD., Tokyo (JP)

(72) Inventors: Yuki Tanaka, Wako (JP); Satoshi Miwa, Wako (JP); Miyuki Shimota, Wako (JP); Fumiaki Yamaguchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 331 days.

(21) Appl. No.: 16/552,789

(22) Filed: Aug. 27, 2019

(65) Prior Publication Data
US 2020/0104890 A1 Apr. 2, 2020

(30) Foreign Application Priority Data
Sep. 27, 2018 (JP) .............................. JP2018-181285

(51) Int. Cl.
*G06Q 30/02* (2012.01)
*G01C 21/34* (2006.01)

(52) U.S. Cl.
CPC ..... *G06Q 30/0284* (2013.01); *G01C 21/3453* (2013.01)

(58) Field of Classification Search
CPC ........................ G06Q 30/0284; G01C 21/3453
USPC .......................................................... 701/533
See application file for complete search history.

(56) References Cited

U.S. PATENT DOCUMENTS

| | | | |
|---|---|---|---|
| 8,630,897 B1 * | 1/2014 | Prada Gomez | G06Q 30/0241 705/14.11 |
| 9,165,103 B1 * | 10/2015 | Salowe | G06F 30/394 |
| 9,389,086 B2 * | 7/2016 | Hashem | G01C 21/20 |
| 9,648,107 B1 * | 5/2017 | Penilla | G06F 3/0482 |
| 2009/0030885 A1 * | 1/2009 | DePasquale | G07C 5/008 |
| 2013/0262222 A1 * | 10/2013 | Gibson | G06Q 10/047 705/14.49 |
| 2015/0294238 A1 * | 10/2015 | Benque | G06Q 10/025 705/6 |

FOREIGN PATENT DOCUMENTS

| | | |
|---|---|---|
| JP | 2004-295392 | 10/2004 |
| JP | 2011-158294 A | 8/2011 |
| JP | 2012-163461 A | 8/2012 |

OTHER PUBLICATIONS

"Route Selection for Vehicle Navigation and Control" By Grantham Pang (Year: 2007).*
Japanese Office Action with English translation dated Oct. 26, 2021, 7 pages.

* cited by examiner

*Primary Examiner* — Zeina Elchanti
(74) *Attorney, Agent, or Firm* — Rankin, Hill & Clark LLP

(57) ABSTRACT

In a vehicle utilization supporting system, a total charge calculation part calculates a total charge including a travel charge calculated by a travel charge calculation part and a predicted excess charge calculated by a predicted excess charge calculation part. In a case where a plurality of moving routes are extracted by a moving route extraction part, a moving route selection information provision part provides selection information of the moving routes based on the total charge for each moving route calculated by the total charge calculation part and predicted moving time for each moving route calculated by a predicted moving time calculation par.

5 Claims, 6 Drawing Sheets

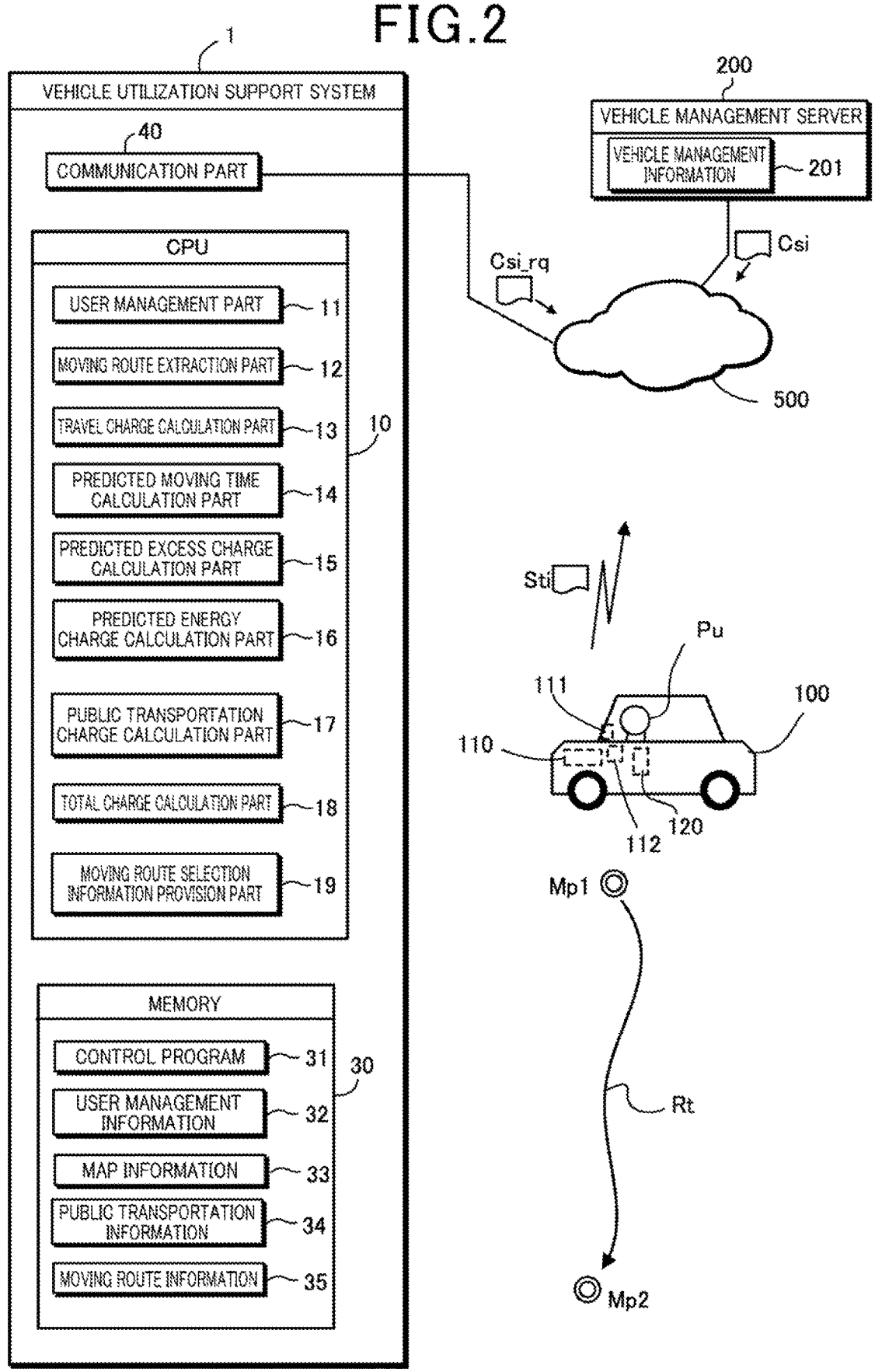

FIG.3

| VEHICLE ID 201a | VEHICLE RESERVATION No. 201b | VEHICLE RESERVATION PERIOD 201c | VEHICLE RENTAL SPOT 201d | VEHICLE RETURN SPOT 201e | USER ID 201f | ... |
|---|---|---|---|---|---|---|
| Cs-001 | Cr-001a<br>Cr-001b<br>Cr-001c<br>Cr-001d | Urt-001a<br>Urt-001b<br>Urt-001c<br>Urt-001d | Usp-001a<br>Usp-001b<br>Usp-001c<br>Usp-001d | Uep-001a<br>Uep-001b<br>Uep-001c<br>Uep-001d | Pu-001<br>Pu-531<br>Pu-341<br>Pu-051 | ⋮ |
| Cs-002 | Cr-002a<br>Cr-002b<br>Cr-002c | Urt-002a<br>Urt-002b<br>Urt-002c | Usp-002a<br>Usp-002b<br>Usp-002c | Uep-002a<br>Uep-002b<br>Uep-002c | Pu-589<br>Pu-711<br>Pu-003 | ⋮ |
| Cs-003 | Cr-003a<br>Cr-003b<br>Cr-003c | Urt-003a<br>Urt-003b<br>Urt-003c | Usp-003a<br>Usp-003b<br>Usp-003c | Uep-003a<br>Uep-003b<br>Uep-003c | Pu-093<br>Pu-099<br>Pu-003 | ⋮ |
| Cs-004 | Cr-004a<br>Cr-004b<br>Cr-004c | Urt-004a<br>Urt-004b<br>Urt-004c | Usp-004a<br>Usp-004b<br>Usp-004c | Uep-004a<br>Uep-004b<br>Uep-004c | Pu-253<br>Pu-421<br>Pu-312 | ⋮ |
| Cs-005 | Cr-005a<br>Cr-005b<br>Cr-005c | Urt-005a<br>Urt-005b<br>Urt-005c | Usp-005a<br>Usp-005b<br>Usp-005c | Uep-005a<br>Uep-005b<br>Uep-005c | Pu-649<br>Pu-185<br>Pu-499 | ⋮ |
| ⋮ | | | | | | |

FIG.4

| MOVING ROUTE No. 35a | TRAVEL CHARGE 35b | PREDICTED REQUIRED TIME 35c | PREDICTED EXCESS CHARGE 35d | PREDICTED ENERGY CHARGE 35e | INTERMEDIATE RETURN 35f | PUBLIC TRANSPORTATION CHARGE 35g | TOTAL CHARGE 35h | ... |
|---|---|---|---|---|---|---|---|---|
| Rt1 | ¥0 | 2 HOURS 30 MINUTES | ¥1,000 | ¥1,300 | ABSENCE | ¥0 | ¥2,300 | ... |
| Rt2 | ¥2,000 | 1 HOUR 30 MINUTES | ¥0 | ¥1,100 | ABSENCE | ¥0 | ¥3,100 | ... |
| Rt3 | ¥0 | 2 HOURS 0 MINUTES | ¥0 | ¥650 | PRESENCE | ¥1,200 | ¥1,850 | ... |

VEHICLE UTILIZATION SUPPORT SYSTEM

INCORPORATION BY REFERENCE

The present application claims priority under 35 U.S.C. § 119 to Japanese Patent Application No. 2018-181285 filed on Sep. 27, 2018. The content of the application is incorporated herein by reference in its entirety.

BACKGROUND OF THE INVENTION

Field of the Invention

The present invention relates to a vehicle utilization support system that supports a user of a vehicle.

Description of the Related Art

Conventionally, a rental car management device that calculates return moving time necessary for movement from a current position of a rental car in use to a return place and compares the return moving time with remaining time before a scheduled return time limit of the rental car is proposed (for example, see Japanese Patent Laid-Open No. 2004-295392).

In the conventional rental car management device, when the return moving time is equal to or longer than the remaining time before the scheduled return time limit, a return instruction screen is displayed on a terminal provided in the rental car.

According to the rental car management device described in Japanese Patent Laid-Open No. 2004-295392, in a case where there is one traveling route to the return place which is a destination, appropriate reporting for a user can be performed. However, sometimes there are a plurality of traveling routes to the destination, and in that case, moving time to the destination and a cost caused accompanying the movement differ depending on the selected traveling route. Then, it is conceivable that the user of a rental vehicle such as the rental car desires selection of an appropriate traveling route in consideration of the movement time to the destination and the cost caused accompanying the movement.

The present invention is implemented in consideration of such a background, and an object is to provide a vehicle utilization support system that takes moving time and a cost caused accompanying movement into consideration and supports selection of a moving route to a destination by a user of a rental vehicle.

SUMMARY OF THE INVENTION

One preferable aspect to achieve the object is a vehicle utilization support system including: a moving route extraction part configured to extract a moving route from a first spot to a second spot including a moving section by a vehicle; a travel charge calculation part configured to calculate a travel charge of the vehicle on the moving route; a predicted moving time calculation part configured to calculate predicted moving time by the moving route; a predicted excess charge calculation part configured to calculate a predicted excess charge predicted to be incurred in a case of moving by the moving route by a rental vehicle for which a usable period is set and which incurs an excess charge when used exceeding the usable period; a total charge calculation part configured to calculate a total charge including the travel charge calculated by the travel charge calculation part and the predicted excess charge calculated by the predicted excess charge calculation part; and a moving route selection information provision part configured to provide, in the case where a plurality of the moving routes are extracted by the moving route extraction part, selection information of the moving routes based on the total charge for each moving route calculated by the total charge calculation part and the predicted moving time for each moving route calculated by the predicted moving time calculation part.

In the vehicle utilization support system, the moving route selection information provision part may execute processing of transmitting movement condition comparison information which enables comparison of the total charge and the predicted moving time among the plurality of moving routes to a communication terminal used by a user of the rental vehicle, as provision of the selection information of the moving routes.

In the vehicle utilization support system, the moving route selection information provision part may execute processing of transmitting information of the moving route by which the total charge becomes lowest among the plurality of moving routes to a communication terminal used by a user of the rental vehicle, as provision of the selection information of the moving routes.

The vehicle utilization support system may include a predicted energy charge calculation part configured to calculate a predicted energy charge which is a charge of energy predicted to be consumed by the vehicle on the moving route, and the total charge calculation part may calculate the total charge including the predicted energy charge calculated by the predicted energy charge calculation part.

In the vehicle utilization support system, the moving route extraction part may extract a combined moving route for which movement by the rental vehicle and movement by public transportation after the rental vehicle is returned are combined, as the moving route, the total charge calculation part may calculate the total charge in the combined moving route including a charge necessary for the movement by the public transportation, and the moving route selection information provision part may provide the selection information including information of the combined moving route.

According to the vehicle utilization support system, for the moving route extracted by the moving route extraction part, the total charge including the travel charge and the predicted excess charge of the rental vehicle and the predicted moving time are calculated. Then, in the case where a plurality of the moving routes are extracted by the moving route extraction part, by the moving route selection information provision part, the selection information of the moving routes based on the total charge and the predicted moving time of the individual moving route is transmitted to the communication terminal used by the user of the rental vehicle. Thus, moving time and a cost caused accompanying movement are taken into consideration and selection of the moving route to a destination by the user of the rental vehicle can be supported.

BRIEF DESCRIPTION OF THE DRAWINGS

FIG. 2 is a configuration diagram of the vehicle utilization support system;

FIG. 3 is an explanatory drawing of vehicle management information;

FIG. 4 is an explanatory drawing of moving route information;

DETAILED DESCRIPTION OF THE PREFERRED EMBODIMENTS

Figure 1:
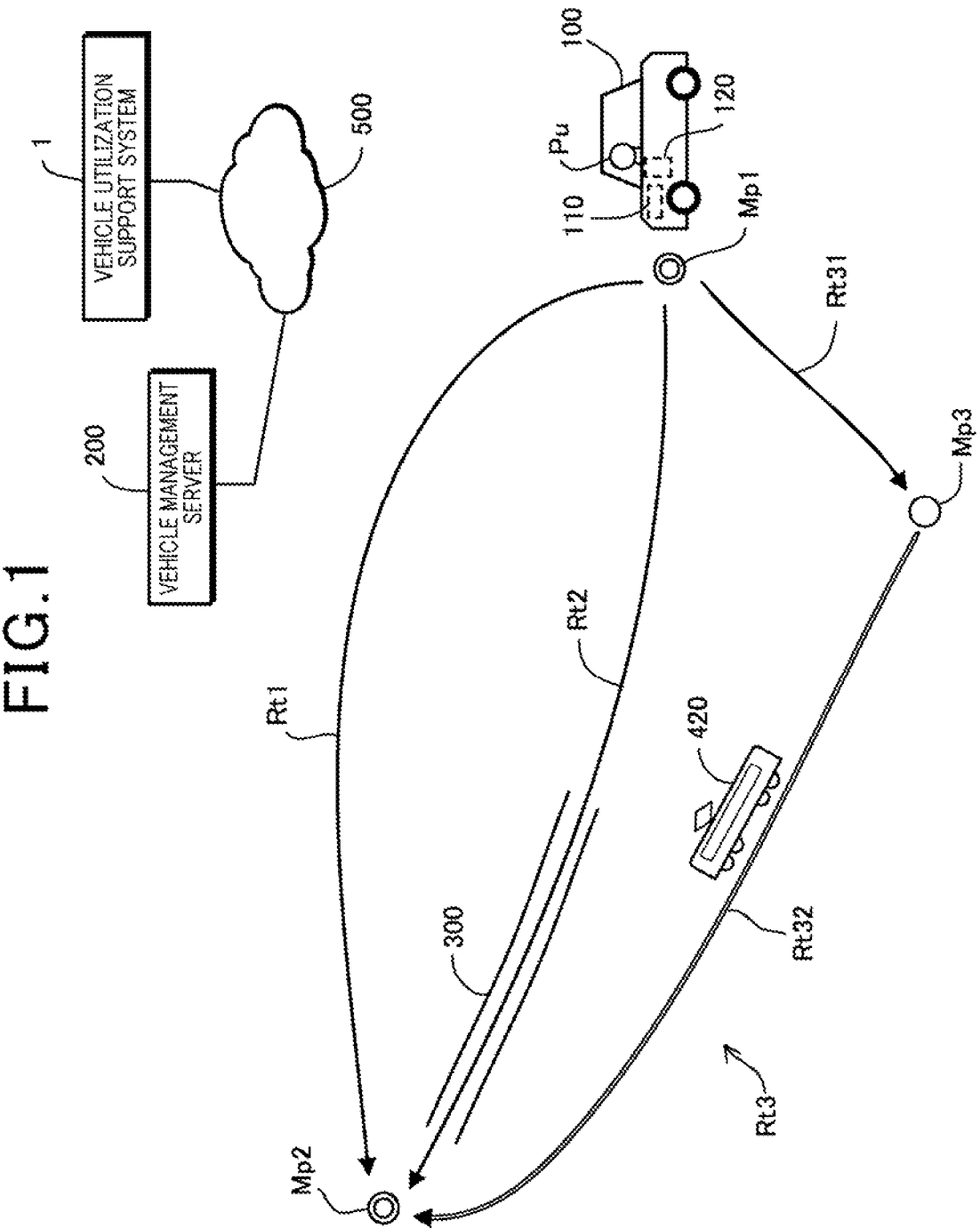
FIG. 1 is an explanatory drawing of a moving route extracted by a vehicle utilization support system.

1. Configuration of Vehicle Utilization Support System

With reference to FIG. 1 to FIG. 4, a configuration of a vehicle utilization support system 1 in the present embodiment will be described. The vehicle utilization support system 1 gives support regarding selection of a moving route when a user Pu of a rental vehicle 100 provided by rental or car sharing or the like moves using the rental vehicle 100.

The vehicle utilization support system 1 communicates with an in-vehicle device 110 loaded on the rental vehicle 100, a user terminal 120 carried by the user Pu of the rental vehicle 100, and a vehicle management server 200 that manages use of the rental vehicle 100, through a communication network 500. The in-vehicle device 110 corresponds to a communication terminal used by the user of the rental vehicle in the present invention.

FIG. 1 shows a case where three moving routes that are a first moving route Rt1, a second moving route Rt2 and a third moving route Rt3 are extracted as the moving route from a first spot Mp1 which is a current position of the rental vehicle 100 to a second spot Mp2 which is a scheduled return spot of the rental vehicle 100 set upon a reservation, by the vehicle utilization support system 1.

The first moving route Rt1 is the moving route of traveling through a general road which does not require a travel charge from the first spot Mp1 to the second spot Mp2. The second moving route Rt2 is the moving route of traveling by utilizing a highway 300 which requires the travel charge from the first spot Mp1 to the second spot Mp2. The third moving route Rt3 is a combined moving route for which movement by the rental vehicle 100 and movement by a train 420 (corresponding to public transportation in the present invention) are combined.

A moving section Rt31 by the rental vehicle 100 is from the first spot Mp1 to a third spot Mp3 of the third moving route Rt3, and the user Pu returns the rental vehicle 100 at the third spot Mp3. A moving section Rt32 by the train 420 is from the third spot Mp3 to the second spot Mp2.

Next, referring to FIG. 2, in a storage device (not shown) of the vehicle management server 200, vehicle management information 201 is stored. As shown in FIG. 3, in the vehicle management information 201, for the individual rental vehicle registered in the vehicle management server 200, a vehicle ID (identification) indicated by a sign 201a, a vehicle reservation No. indicated by a sign 201b, a vehicle reservation period (a usable period of the vehicle) indicated by a sign 201c, a vehicle rental spot indicated by a sign 201d, a vehicle return spot indicated by a sign 201e, and a user ID indicated by a sign 201f or the like are recorded. When a rental vehicle is not returned within the vehicle reservation period, an excess charge is incurred.

The vehicle utilization support system 1 is a computer system configured by a CPU (Central Processing Unit) 10, a memory 30, and a communication part 40 or the like. In the memory 30, a control program 31 of the vehicle utilization support system 1, user management information 32, map information 33, public transportation information 34, and moving route information 35 or the like are stored. In the user management information 32, a profile of the user registered to receive a support service provided by the vehicle utilization support system 1, and a user ID issued to the user or the like are recorded. In the map information 33, road information including information of toll roads such as highways is recorded. In the public transportation information 34, information of operating routes, charges and required time or the like of the public transportation such as railroads and buses is recorded.

In the moving route information 35, as shown in FIG. 4, for the individual moving routes extracted by a moving route extraction part 12 to be described later, information of a moving route No. indicated by a sign 35a, the travel charge indicated by a sign 35b, predicated required time indicated by a sign 35c, a predicated excess charge indicated by a sign 35d, a predicted energy charge indicated by a sign 35e, presence/absence of a rental vehicle intermediate return spot indicated by a sign 35f, a public transportation charge indicated by a sign 35g, and a total charge 35h or the like is recorded. In FIG. 4, the information of the first moving route Rt1, the second moving route Rt2, and the third moving route Rt3 shown in FIG. 1 is illustrated.

By reading and executing the control program 31 stored in the memory 30, the CPU 10 functions as a user management part 11, the moving route extraction part 12, a travel charge calculation part 13, a predicted moving time calculation part 14, a predicted excess charge calculation part 15, a predicted energy charge calculation part 16, a public transportation charge calculation part 17, a total charge calculation part 18, and a moving route selection information provision part 19. Hereinafter, processing in the case that the user Pu uses the rental vehicle 100 provided by car sharing will be described.

When user information transmitted from the user terminal 120 according to a registration operation by the user Pu is received, the user management part 11 records the information of the profile of the user Pu included in the user information and the user ID issued to the user Pu or the like in the user management information 32. In addition, when reservation information of the rental vehicle 100 including the vehicle reservation No. is received from the user terminal 120, the user management part 11 transmits a reservation content request Csi_rq requesting transmission of reservation content information Csi indicating reservation content of the rental vehicle 100 to the vehicle management server 200.

The vehicle management server 200 which receives the reservation content request Csi_rq refers to the vehicle management information 201, and transmits the reservation content information Csi of the rental vehicle 100 to the vehicle utilization support system 1. The user management part 11 recognizes the reservation content of the rental vehicle 100 by the user Pu by the reservation content information Csi, and records the reservation content in the user management information 32. The reservation content includes the reservation period and the scheduled return spot of the rental vehicle 100.

The in-vehicle device 110 loaded on the rental vehicle 100 has a function of detecting the current position of the rental vehicle 100 by a GPS (Global Positioning System) sensor and a function of guiding a route to a destination. The in-vehicle device 110 guides the route by displaying a map indicating the moving route on a display 111 and outputting guidance by voice from a speaker 112.

The moving route extraction part 12 recognizes the current position of the rental vehicle 100 by receiving current position information of the rental vehicle 100 transmitted from the in-vehicle device 110 of the rental vehicle 100. In addition, the moving route extraction part 12 refers to the reservation content of the rental vehicle 100 recorded in the user management information 32, and recognizes the scheduled return spot of the rental vehicle 100. Then, the moving route extraction part 12 refers to the map information 33 and extracts a moving route Rt from the first spot Mp1 which is the current position of the rental vehicle 100 to the second spot Mp2 which is the scheduled return spot.

In the case where the moving route Rt extracted by the moving route extraction part 12 includes a traveling section of a toll road such as a highway, the travel charge calculation part 13 calculates the travel charge on the moving route Rt on a basis of the map information 33 or the road information received from a traffic information server (not shown) or the like.

The predicted moving time calculation part 14 calculates the predicted moving time by the moving route Rt on the basis of a traveling distance and an assumed traveling speed for the traveling section by the rental vehicle 100, and calculates the predicted moving time by referring to the public transportation information 34 for the moving section utilizing the public transportation. Here, the assumed traveling speed of the rental vehicle 100 is set at 100 km/hour on the highway and 40 km/hour on the general road for example. The predicted excess charge calculation part 15 calculates a predicted excess charge when it is assumed that the reservation period of the rental vehicle 100 elapses while the user Pu is in the middle of moving on the moving route Rt by the rental vehicle 100.

The predicted energy charge calculation part 16 calculates the predicted energy charge which is a charge of energy predicted to be consumed by the rental vehicle 100 when moving on the moving route Rt using the rental vehicle 100, according to a model of the rental vehicle 100. Specifically, the predicted energy charge calculation part 16 calculates energy consumption of the rental vehicle 100 on the moving route Rt by dividing the traveling distance of the rental vehicle 100 by energy consumption per unit distance of the rental vehicle 100 set according to the model of the rental vehicle 100 and a kind (the highway or the general road) of a traveling road.

Then, the predicted energy charge calculation part 16 calculates the predicted energy charge of the rental vehicle on the moving route Rt by multiplying the energy consumption of the rental vehicle 100 on the moving route Rt by an energy charge per unit amount. For example, when the rental vehicle 100 is a vehicle that uses fossil fuel such as gasoline, the charge of the fossil fuel to be consumed is the predicted energy charge. In addition, when the rental vehicle 100 is an electrically driven vehicle, the charge of electric power to be consumed is the predicted energy charge. The public transportation charge calculation part 17 calculates a utilization charge of the public transportation to be required when the moving route Rt includes the moving section utilizing the public transportation.

The total charge calculation part 18 calculates a total charge which is a total of the travel charge calculated by the travel charge calculation part 13, the predicted excess charge calculated by the predicted excess charge calculation part 15, the predicted energy charge calculated by the predicted energy charge calculation part 16, and the utilization charge of the public transportation calculated by the public transportation charge calculation part 17.

In the case where the plurality of moving routes Rt are extracted by the moving route extraction part 12, the moving route selection information provision part 19 provides moving route selection information regarding selection of the moving route.

2. First Embodiment of Moving Route Selection Information Provision Processing

According to a flowchart shown in FIG. 5, a first embodiment of provision processing of moving route selection information executed by the vehicle utilization support system 1 will be described.

When the registration operation for receiving the support service by the vehicle utilization support system 1 is performed by the user Pu of the rental vehicle 100, in step S20, the user terminal 120 transmits user information Usi and reservation information Rnti of the rental vehicle 100 inputted by the registration operation to the vehicle utilization support system 1. The user information Usi includes the profile of the user Pu or the like, and the reservation information Rnti includes the vehicle reservation No. issued when the user Pu reserves the rental vehicle 100.

In step S1, the user management part 11 of the vehicle utilization support system 1 receives the user information Usi and the reservation information Rnti. Then, the user management part 11 issues the user ID by performing registration processing of the user Pu, and records the profile and the user ID of the user Pu in the user management information 32. In addition, the user management part 11 transmits the reservation content request Csi_rq including the vehicle reservation No. to the vehicle management server 200. Then, the user management part 11 recognizes the reservation content of the rental vehicle 100 by the user Pu by receiving the reservation content information Csi transmitted from the vehicle management server 200, and records the information of the reservation period and the scheduled return spot of the rental vehicle 100 in the user management information 32.

In step S21, the user terminal 120 transmits use start information of the rental vehicle 100 to the vehicle utilization support system 1 according to a use start operation of the rental vehicle 100 by the user Pu. In step S2, the moving route extraction part 12 of the vehicle utilization support system 1 receives use start information Cust of the rental vehicle 100 from the user terminal 120, and also receives vehicle information Cinf from the rental vehicle 100. The vehicle information Cinf includes the information of the current position and the model of the rental vehicle 100. Then, the moving route extraction part 12 refers to the map information 33 and extracts the moving route Rt from the first spot Mp1 which is the current position of the rental vehicle 100 to the second spot Mp2 which is the scheduled return spot of the rental vehicle 100.

In next step S3, for the moving route Rt extracted by the moving route extraction part 12, the travel charge is calculated by the travel charge calculation part 13, the predicted moving time is calculated by the predicted moving time calculation part 14, and the predicted excess charge is calculated by the predicted excess charge calculation part 15. In addition, the predicted energy charge is calculated by the predicted energy charge calculation part 16, the public transportation charge is calculated by the public transportation charge calculation part 17, and the total charge is calculated by the total charge calculation part 18.

Then, the moving route selection information provision part 19 records movement information including the travel charge, the predicted required time, the predicted excess charge, the predicted energy charge, the public transportation charge, and the total charge that are calculated for the individual moving route Rt in the moving route information 35 for each moving route Rt. In an example shown in FIG. 1, the first moving route Rt1, the second moving route Rt2 and the third moving route Rt3 are extracted by the moving route extraction part 12, and as shown in FIG. 4, the movement information of the first moving route Rt1, the second moving route Rt2 and the third moving route Rt3 is recorded in the moving route information 35.

In subsequent step S4, the moving route selection information provision part 19 transmits movement condition Mcnd indicating movement conditions of the individual moving routes Rt to the user terminal 120. In this case, the movement condition Mcnd may include the travel charge, the predicted required time, the predicted excess charge, the predicted energy charge, the public transportation charge, and the total charge shown in FIG. 4, and may include only the predicted required time and the total charge for example. The movement condition Mcnd corresponds to movement condition comparison information which enables comparison of the total charge and the predicted moving time of each moving route of the present invention.

In step S22, the user terminal 120 receives the movement conditions of the individual moving routes Rt, and displays a moving route selection screen at a display part (not shown). On the selection screen, paths of the individual moving routes Rt1, Rt2 and Rt3 shown in FIG. 1 and the movement conditions of the individual moving routes shown in FIG. 4 are listed and displayed, and the user Pu can confirm the selection screen and select any desired moving route.

In next step S23, when a moving route selecting operation is performed by the user Pu, the user terminal 120 advances processing to step S24, and transmits selection result information Seli indicating a selection result to the vehicle utilization support system 1. When the selection result information Seli is received from the user terminal 120 in step S5, the moving route selection information provision part 19 of the vehicle utilization support system 1 transmits selected moving route information Srti indicating the selected moving route to the rental vehicle 100.

In step S51, the in-vehicle device 110 of the rental vehicle 100 receives the selected moving route information Srti from the vehicle utilization support system 1, and executes route guiding according to the moving route indicated by the selected moving route information Srti. The in-vehicle device 110 guides the route by displaying the map indicating the moving route on the display 111 and outputting the guidance by voice from the speaker 112.

3. Second Embodiment of Moving Route Selection Information Provision Processing According to a flowchart shown in FIG. 6, a second embodiment of moving route selection information provision processing executed by the vehicle utilization support system 1 will be described.

Figure 5:
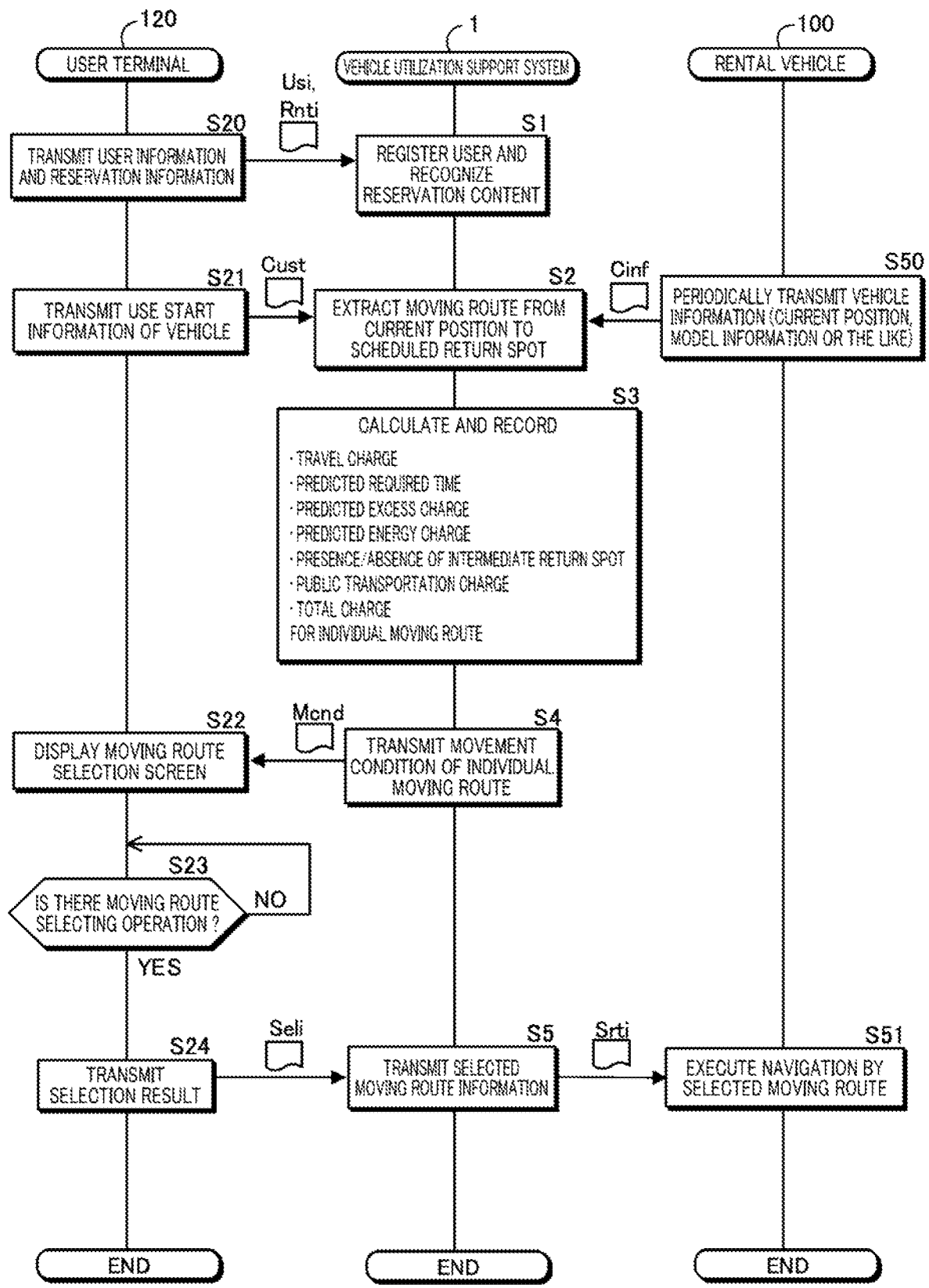
FIG. 5 is a flowchart of a first embodiment of provision processing of moving route selection information.
Figure 6:
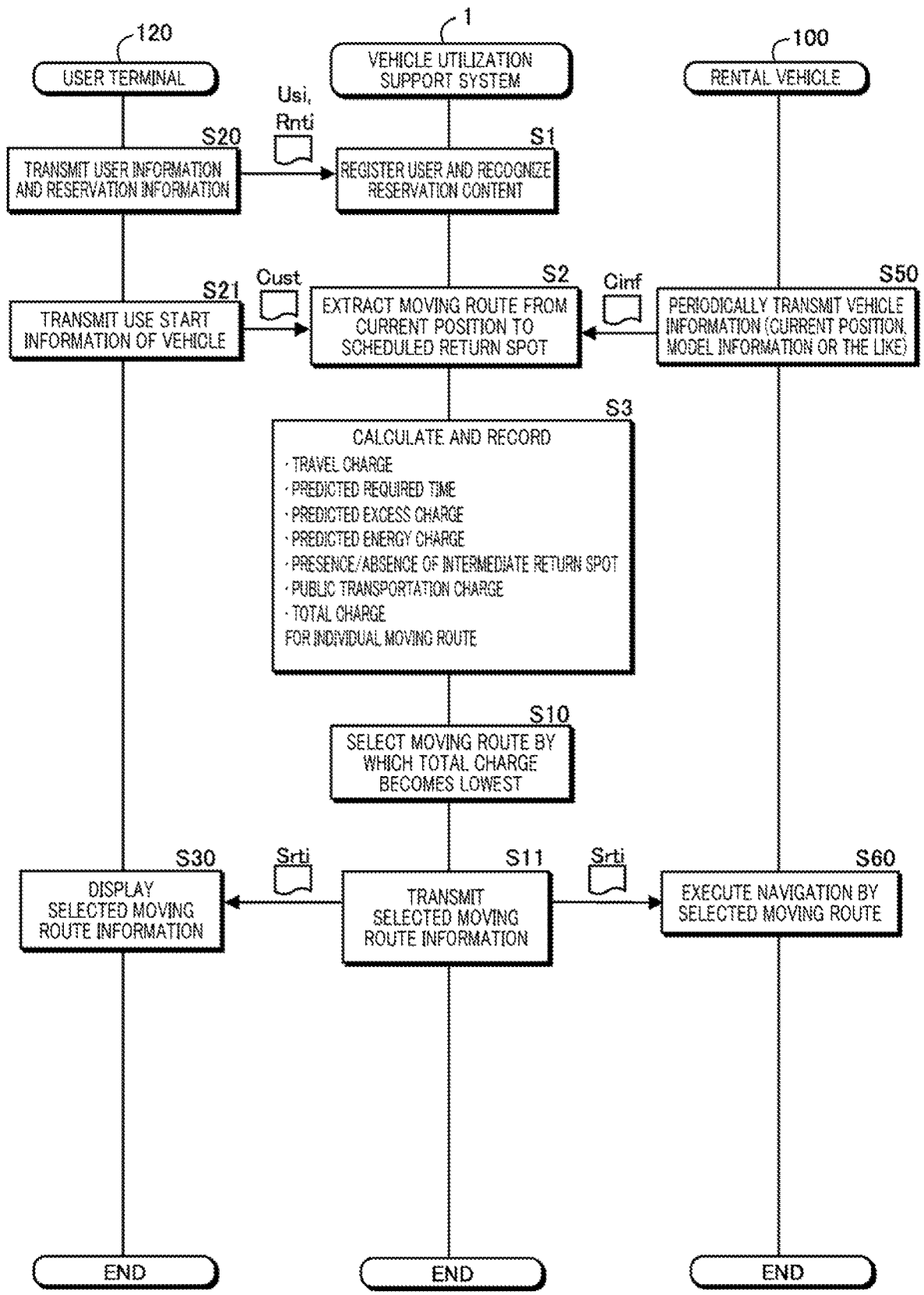
FIG. 6 is a flowchart of a second embodiment of the provision processing of the moving route selection information.

The processing of steps S1-S3 by the vehicle utilization support system, the processing of steps S20-S21 by the user terminal 120, and the processing of step S50 by the rental vehicle 100 in FIG. 6 are in common with the flowchart in FIG. 5 described above. Therefore, here, the processing of step S10 and thereafter will be described.

In step S10, in the case where the plurality of moving routes are extracted by the moving route extraction part 12, the moving route selection information provision part 19 of the vehicle utilization support system 1 compares the total charges of the individual moving routes recorded in the moving route information 35. Then, the moving route selection information provision part 19 selects the moving route by which the total charge becomes lowest. In the example shown in FIG. 4, among the three extracted moving routes Rt1, Rt2 and Rt3, the third moving route Rt3 of the lowest total charge is selected.

In subsequent step S11, the moving route selection information provision part 19 transmits the selected moving route information Srti indicating the selected moving route to the user terminal 120 and the rental vehicle 100. In step S30, the user terminal 120 receives the selected moving route information Srti from the vehicle utilization support system 1, and displays the path, predicted required time, and the total charge or the like of the selected moving route at the display part.

In addition, in step S60, the in-vehicle device 110 of the rental vehicle 100 receives the selected moving route information Srti from the vehicle utilization support system 1, and executes the route guiding according to the selected moving route. The in-vehicle device 110 guides the route by displaying the map showing the moving route at the display 111 and outputting the guidance by voice from the speaker 112.

4. Other Embodiments

In the embodiments described above, the vehicle utilization support system 1 is configured by the computer system that communicates with the user terminal 120 and the rental vehicle 100 through the communication network 500. The vehicle utilization support system 1 may be configured by the in-vehicle device 110 loaded on the rental vehicle 100 or the user terminal 120.

In the case where the vehicle utilization support system is configured by the in-vehicle device 110, the in-vehicle device 110 accesses the vehicle management server 200, recognizes the reservation content of the rental vehicle 100, and extracts the moving route to the scheduled return spot of the rental vehicle 100. Then, the selection information of the moving routes is displayed at the display part of the in-vehicle device 110, or the selection information of the moving routes is transmitted from the in-vehicle device 110 to the user terminal 120 and the selection information of the moving routes is displayed at the display part of the user terminal 120.

In the case where the vehicle utilization support system is configured by the user terminal 120, the user terminal 120 accesses the vehicle management server 200, recognizes the reservation content of the rental vehicle 100, and extracts the moving route to the scheduled return spot of the rental vehicle 100. Then, the selection information of the moving routes is displayed at the display part of the user terminal 120.

In the embodiment described above, in step S10 in FIG. 6, the moving route selection information provision part 19 selects the moving route by which the total charge becomes the lowest from the plurality of moving routes extracted by the moving route extraction part 12, however, other selection conditions may be used. For example, the moving route by which the predicted moving time becomes shortest may be selected.

Note that FIG. 2 is a schematic diagram in which a functional configuration of the vehicle utilization support system 1 is divided and indicated depending on main processing content for easy understanding of the present invention, and the configuration of the vehicle utilization support system 1 may be configured by other divisions. In addition, the processing of individual components may be executed by one hardware unit, or may be executed by a plurality of hardware units. Furthermore, the processing of the individual components shown in FIG. 2 may be executed by one program, or may be executed by a plurality of programs.

1 . . . vehicle utilization support system, 10 . . . CPU, 11 . . . user management part, 12 . . . moving route extraction part, 13 . . . travel charge calculation part, 14 . . . predicted moving time calculation part, 15 . . . predicted excess charge calculation part, 16 . . . predicted energy charge calculation part, 17 . . . public transportation charge calculation part, 18 . . . total charge calculation part, 19 . . . moving route selection information provision part, 30 . . . memory, 31 . . . control program, 32 . . . user management information, 33 . . . map information, 34 . . . public transportation information, 35 . . . moving route information, 100 . . . rental vehicle, 110 . . . in-vehicle device, 120 . . . user terminal, 200 . . . vehicle management server, 201 . . . vehicle management information, 300 . . . highway, Pu . . . user, Rt1, Rt2, Rt3 . . . moving route.

What is claimed is:

1. A vehicle utilization support system that communicates with an in-vehicle device loaded on a rental vehicle that is provided by rental or car sharing, a user terminal carried by a user of the rental vehicle, and a vehicle management server that manages use of the rental vehicle, through a communication network, wherein,
   in the vehicle management server, a vehicle reservation period, a vehicle rental spot, and a vehicle return spot are recorded in association with an identification of the rental vehicle,
   the utilization support system comprising a CPU and a memory, wherein the CPU functions as:
   a moving route extraction part configured to extract a moving route from a first spot which is a current position of the rental vehicle received from the in-vehicle device to a second spot which is the vehicle return spot of the rental vehicle;
   a travel charge calculation part configured to calculate, on a basis of a map information recorded in the memory, a travel charge of the vehicle on the moving route in a case where the moving route includes a traveling section of a toll road;
   a predicted moving time calculation part configured to calculate predicted moving time by the moving route on a basis of a traveling distance and a traveling speed assumed from the map information;
   a predicted excess charge calculation part configured to calculate a predicted excess charge predicted to be incurred when it is assumed, based on the calculated result by the predicted moving time calculation part, that the vehicle reservation period elapses while moving on the moving route by the rental vehicle;
   a total charge calculation part configured to calculate a total charge including the travel charge calculated by the travel charge calculation part and the predicted excess charge calculated by the predicted excess charge calculation part; and
   a moving route selection information provision part configured to transmit, in a case where a plurality of the moving routes are extracted by the moving route extraction part, selection information of the moving routes to the user terminal based on the total charge for each moving route calculated by the total charge calculation part and the predicted moving time for each moving route calculated by the predicted moving time calculation part.

2. The vehicle utilization support system according to claim 1, wherein the moving route selection information provision part executes processing of transmitting movement condition comparison information which enables comparison of the total charge and the predicted moving time among the plurality of moving routes to the user terminal, as provision of the selection information of the moving routes.

3. The vehicle utilization support system according to claim 1, wherein the moving route selection information provision part executes processing of transmitting information of the moving route by which the total charge becomes lowest among the plurality of moving routes to the user terminal, as provision of the selection information of the moving routes.

4. The vehicle utilization support system according to claim 1, wherein the CPU functions as
   a predicted energy charge calculation part configured to calculate, according to a model of the rental vehicle and the travel distance by the moving route, a predicted energy charge which is a charge of energy predicted to be consumed by the vehicle on the moving route,
   wherein the total charge calculation part calculates the total charge including the predicted energy charge calculated by the predicted energy charge calculation part.

5. The vehicle utilization support system according to claim 1, wherein
   the moving route extraction part extracts a combined moving route for which movement by the rental vehicle and movement using public transportation are combined, as the moving route,
   the total charge calculation part calculates the total charge in the combined moving route by calculating, based on the map information, utilization charge necessary for the movement by the public transportation and including the utilization charge of the public transportation, and
   the moving route selection information provision part transmit the selection information including information of the combined moving route to the user terminal.

* * * * *